(12) United States Patent
Xia et al.

(10) Patent No.: US 11,380,012 B2
(45) Date of Patent: Jul. 5, 2022

(54) METHOD AND APPARATUS FOR VISUAL POSITIONING BASED ON MOBILE EDGE COMPUTING

(71) Applicant: Baidu Online Network Technology (Beijing) Co., Ltd., Beijing (CN)

(72) Inventors: Deguo Xia, Beijing (CN); Jizhou Huang, Beijing (CN); Liuhui Zhang, Beijing (CN); Kai Zhong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/112,221

(22) Filed: Dec. 4, 2020

(65) Prior Publication Data
US 2021/0383568 A1 Dec. 9, 2021

(30) Foreign Application Priority Data
Jun. 4, 2020 (CN) .......................... 202010501319.8

(51) Int. Cl.
*G06T 7/73* (2017.01)
*G06T 7/80* (2017.01)
*G06V 20/56* (2022.01)

(52) U.S. Cl.
CPC ............... *G06T 7/74* (2017.01); *G06T 7/80* (2017.01); *G06V 20/588* (2022.01);
(Continued)

(58) Field of Classification Search
CPC .... G01C 21/20; G01C 21/30; G01C 21/3602; G06T 7/80; G06T 7/74;
(Continued)

(56) References Cited

U.S. PATENT DOCUMENTS

2018/0039276 A1\* 2/2018 Keivan ................... G06T 7/74
2018/0336697 A1   11/2018 Lu et al.
(Continued)

FOREIGN PATENT DOCUMENTS

CN 107063189 A 8/2017
CN 110164135 A 8/2019
(Continued)

OTHER PUBLICATIONS

Horsmanheimo, Seppo, et al. "Indoor positioning platform to support 5G location based services." 2019 IEEE International Conference on Communications Workshops (ICC Workshops). IEEE, 2019. (Year: 2019).\*

(Continued)

*Primary Examiner* — Vu Le
*Assistant Examiner* — Tracy Mangialaschi
(74) *Attorney, Agent, or Firm* — Seed IP Law Group LLP (57) ABSTRACT

A method and an apparatus for visual positioning based on mobile edge computing are provided. In the method, the mobile edge computing node receives an environment image captured by a to-be-positioned device in an area covered by the mobile edge computing node; the mobile edge computing node determines a target image matching the environment image from multiple candidate images, and calculates the position and pose information of the to-be-positioned device based on the position and pose information of the device for capturing the target image; and the mobile edge computing node sends the position and pose information of the to-be-positioned device to the to-be-positioned device, so that the to-be-positioned device determines the positioning information in an electronic map according to the position and pose information.

20 Claims, 5 Drawing Sheets

(52) U.S. Cl.
CPC ............ *G06T 2207/10024* (2013.01); *G06T 2207/20021* (2013.01); *G06T 2207/30184* (2013.01); *G06T 2207/30252* (2013.01)

(58) Field of Classification Search
CPC . G06T 2207/20021; G06T 2207/30244; G06T 2207/20076; G06T 2207/30184; G06T 2207/30252; G06T 2207/10024; G06K 9/00798; G06K 9/46; G06K 9/6201; G06V 10/40; G06V 10/82; G06V 20/588
See application file for complete search history.

(56) References Cited

U.S. PATENT DOCUMENTS

| | | | |
|---|---|---|---|
| 2019/0005718 A1 | 1/2019 | Zhou et al. | |
| 2019/0206124 A1* | 7/2019 | Zhou | G01C 21/005 |

FOREIGN PATENT DOCUMENTS

| | | |
|---|---|---|
| CN | 110322500 A | 10/2019 |
| CN | 110609311 A | 12/2019 |
| CN | 110631554 A | 12/2019 |

OTHER PUBLICATIONS

Wang, E., and W. Yan. "iNavigation: an image based indoor navigation system." Multimedia tools and applications 73.3 (2014): 1597-1615. (Year: 2014).*
Extended European Search Report for European Application No. 21166144.2, dated Sep. 6, 2021, 11 pages.
Horsmanheimo et al., "Indoor positioning platform to support 5G location based services," 2019 IEEE International Conference on Communications Workshops, May 20, 2019, 6 pages.
Chinese Office Action for Chinese Application No. 202010501319.8, dated Sep. 3, 2021, 22 pages.
"Fundamentals of software technology," Aug. 31, 2008, pp. 47-48.
"Research on video image processing vision algorithm based on surveillance scene," Sep. 30, 2018, pp. 126-127.
Chen, "Introduction to Cognitive Computing," Huazhong University of Science and Technology Press, 2017, 5 pages.
Chinese Office Action for Chinese Application No. 202010501319.8, dated Apr. 19, 2022, 9 pages.
Wang et al., "Mobile Edge Computing," Beijing University of Posts and Telecommunications Press, Aug. 2017, 7 pages.

* cited by examiner

METHOD AND APPARATUS FOR VISUAL POSITIONING BASED ON MOBILE EDGE COMPUTING

CROSS-REFERENCE TO RELATED APPLICATIONS

This application claims the priority to Chinese Patent Application No. 202010501319.8, titled "METHOD AND APPARATUS FOR VISUAL POSITIONING BASED ON MOBILE EDGE COMPUTING," filed on Jun. 4, 2020, the content of which is incorporated herein by reference in its entirety.

TECHNICAL FIELD

This disclosure relates to computer technology, and more particularly to the field of computer vision image technology.

BACKGROUND

When a user uses a navigation product, whether driving navigation or walking navigation, it is necessary to obtain the position of the user in real time to accurately plan the route of the user.

GPS (Global Positioning System), as a widely used positioning scheme, is susceptible to satellite conditions, weather conditions, and data link transmission conditions. For example, in on/under bridge scenarios, main and auxiliary road scenarios, indoor and tall-building dense commercial areas, GPS is not available. Therefore, there is a need for a new positioning method to solve the navigation positioning problem in the scenarios such as on/under the viaduct, the main and auxiliary roads, the indoor and tall-building dense commercial areas, and the like.

SUMMARY

Embodiments of the disclosure provides a method and an apparatus for visual positioning based on mobile edge computing.

According to a first aspect, an embodiment of the present disclosure provides a method for visual positioning based on mobile edge computing, including:

receiving, by a mobile edge computing node, an environmental image captured by a to-be-positioned device in an area covered by the mobile edge computing node;

determining by the mobile edge computing node a target image matching the environment image from a plurality of candidate images, and calculating position and pose information of the to-be-positioned device based on position and pose information of a device for capturing the target image; and sending by the mobile edge computing node the position and pose information of the to-be-positioned device to the to-be-positioned device, so that the to-be-positioned device determines positioning information in an electronic map according to the position and pose information.

According to a second aspect, an embodiment of the present disclosure provides an apparatus for visual positioning based on a mobile edge computing, including:

a receiving module, configured to receive an environment image captured by a to-be-positioned device in an area covered by the mobile edge computing node;

a calculation module, configured to determine a target image matching the environment image from a plurality of candidate images, and calculating position and pose information of the to-be-positioned device based on position and pose information of a device for capturing the target image; and a sending module, configured to send the position and pose information of the to-be-positioned device to the to-be-positioned device, so that the to-be-positioned device determines positioning information in an electronic map according to the position and pose information.

According to a third aspect, an embodiment of the present disclosure provides an electronic device including:

at least one processor; and a memory in communication with the at least one processor; where, the memory stores instructions executable by the at least one processor, the instructions being executed by the at least one processor to enable the at least one processor to perform the method for visual positioning based on mobile edge computing provided in any of the embodiments.

In a fourth aspect, an embodiment of the present disclosure further provides a non-transitory computer-readable storage medium storing computer instructions for causing the computer to perform the method for visual positioning based on mobile edge computing provided in any of the embodiments.

According to an embodiment of the present disclosure, a positioning method based on computer vision is adopted, and the positioning method is particularly suitable for positioning in a complex scenario.

It should be understood that the description in this section is not intended to identify key or critical features of embodiments of the disclosure, nor is it intended to limit the scope of the disclosure. Other features of the present disclosure will become readily apparent from the following description.

BRIEF DESCRIPTION OF THE DRAWINGS

The drawings are intended to provide a better understanding of the present disclosure and are not to be construed as limiting the disclosure, where.

DETAILED DESCRIPTION OF EMBODIMENTS

Exemplary embodiments of the present disclosure are described below in connection with the accompanying drawings, in which various details of embodiments of the present disclosure are included to facilitate understanding, and are to be considered as exemplary only. Accordingly, one of ordinary skill in the art will recognize that various changes and modifications may be made to the embodiments described herein without departing from the scope and spirit of the present disclosure. Also, for clarity and conciseness, descriptions of well-known functions and structures are omitted from the following description.

Figure 1A:
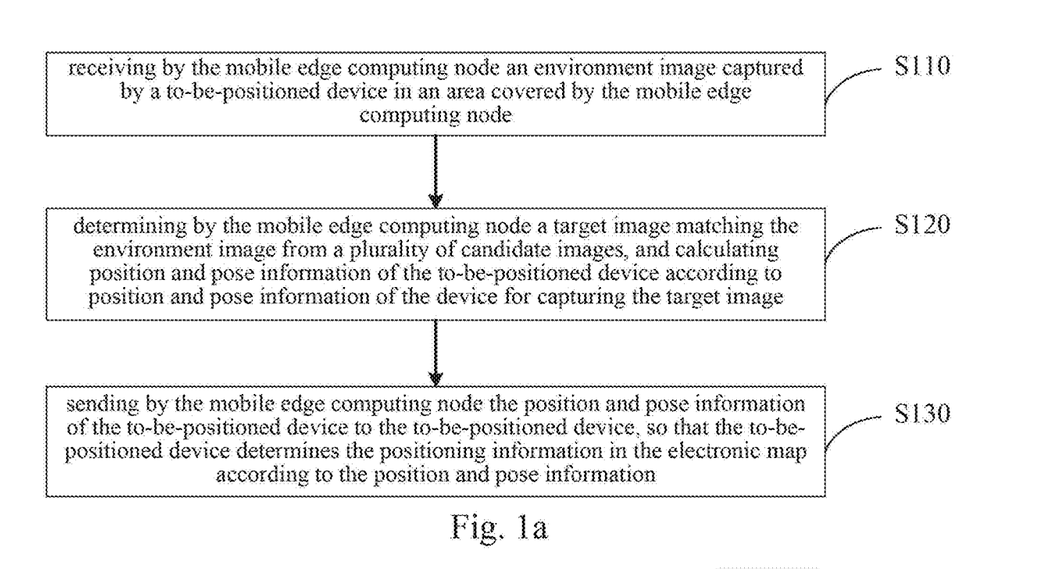
FIG. 1a is a flow chart of a first method for visual positioning based on mobile edge computing in an embodiment of the present disclosure.

According to an embodiment of the present disclosure, FIG. 1*a* is a flowchart of a first method for visual positioning based on mobile edge computing in embodiments of the present disclosure. Embodiments of the present disclosure is applicable to a case where a device is positioned, and is particularly applicable to a case where GPS is unavailable in scenarios such as on/under the viaduct, the main and auxiliary roads, the indoor and tall-building dense commercial areas. The method is performed by an apparatus for visual positioning based on mobile edge computing, which is implemented in software and/or hardware and is specifically arranged in a mobile edge computing node having a certain data computing capability.

As shown in FIG. 1*a*, a method for visual positioning based on mobile edge computing includes S110 to S130.

S110 includes receiving by the mobile edge computing node an environment image captured by a to-be-positioned device in an area covered by the mobile edge computing node.

For ease of description and differentiation, a device needing local positioning is referred to as a to-be-positioned device, for example, a mobile terminal such as a mobile phone, a smart watch, or a fixed terminal such as a desktop computer.

When the to-be-positioned device is located in scenarios that GPS is not available, such as on/under the viaduct, the main and auxiliary roads, the indoor and tall-building dense commercial areas, the camera may be turned on to capture an environment around the to-be-positioned device, to obtain an environment image. In order to improve the positioning accuracy and highlight the characteristics of the geographical location, generally photographs of landmark buildings around the device need to be taken.

After the shooting is completed, the environment image is transmitted to the nearest mobile edge computing (MEC) node. The MEC node provides Internet technical service environment, computing, and storage functions within a radio access network (RAN). The MEC node is logically independent of the rest of the network, which is important for applications with high security requirements. In addition, MEC nodes generally have high computational power and are therefore particularly suitable for analyzing and processing large amounts of data. Meanwhile, since the MEC node is geographically close to the user or the information source, the delay of the network in response to the user request is greatly reduced, and the possibility of network congestion in the transmission network and the core network part is also reduced. Different MEC nodes have different coverage areas, so that a plurality of MEC nodes process environment images transmitted in different coverage areas.

Figure 1B:
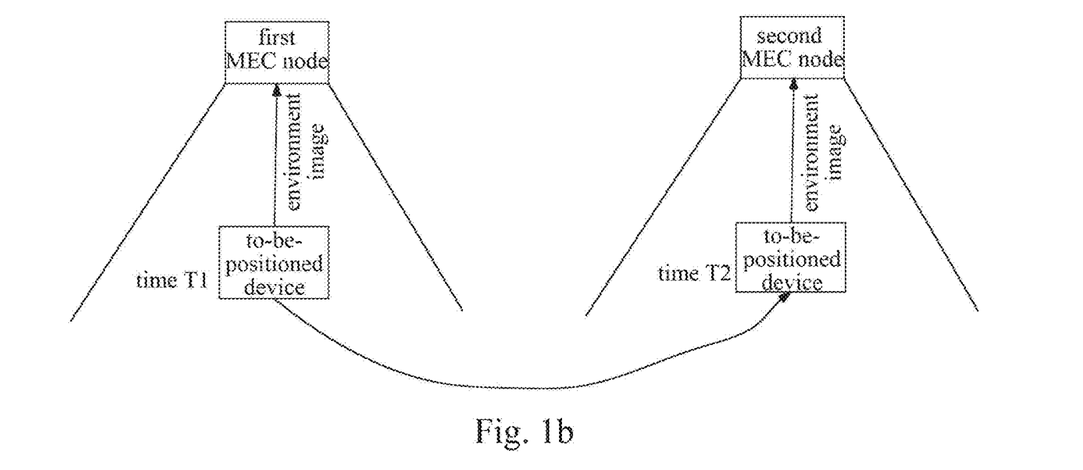
FIG. 1b is a schematic diagram of a coverage of a MEC node according to an embodiment of the present disclosure.

FIG. 1*b* is a schematic diagram of MEC node coverage according to an embodiment of the present disclosure. The to-be-positioned device at time T1 is located in the coverage area of the first MEC node, and subsequently, the to-be-positioned device at time T2 is located in the coverage area of the second MEC node. The to-be-positioned device sends the environment image captured at time T1 to the first MEC node, and sends the environment image captured at time T2 to the second MEC node.

S120 includes determining by the mobile edge computing node a target image matching the environment image from a plurality of candidate images, and calculating position and pose information of the to-be-positioned device according to position and pose information of the device for capturing the target image.

In the present embodiment, the MEC node pre-stores a plurality of candidate images and position and pose information of the device in each captured candidate image. The plurality of candidate images are images taken at different locations, for example, images taken from multiple locations for multiple landmark buildings. The position and pose information includes position information and pose information, that is, information of six degrees of freedom (including translation along the x-axis, translation along the y-axis, translation along the z-axis, rotation about the x-axis, rotation about the y-axis, and rotation about the z-axis) of the device in the earth coordinate system (including the x-axis, the y-axis, and the z-axis).

Matching with the environment image is being consistent with the image content of the environment image, for example, the image includes the same kind of entities and the same orientation. Optionally, the MEC node also stores entity types and orientations in each candidate image which are identified in advance. The entity type and orientation in the environment image are identified, a candidate image consistent with the entity type and orientation in the environment image is selected as the target image, and may be regarded that the position information and pose information of the device for capturing the target image is consistent with the position and pose information of the to-be-positioned device.

S130 includes sending by the mobile edge computing node the position and pose information of the to-be-positioned device to the to-be-positioned device, so that the to-be-positioned device determines the positioning information in an electronic map according to the position and pose information.

After receiving the position and pose information, the to-be-positioned device determines the positioning information according to the position and pose information, and displays the positioning information in an electronic map running in the to-be-positioned device.

Illustratively, in the two-dimensional electronic map, a position in the electronic map is determined based on a translation position along the x-axis and the y-axis, and an orientation in the electronic map is determined based on an angle of rotation about the z-axis.

Illustratively, in the three-dimensional electronic map, a position in the electronic map is determined based on a translation position along the x-axis, the y-axis, and the z-axis, and an orientation in the electronic map is determined based on an angle of rotation about the x-axis, the y-axis, and the z-axis.

In this embodiment, the MEC node is used as an execution body, and a plurality of candidate images and the position and pose information of a device for capturing the candidate images are pre-deployed in the MEC node to form localization and close-distance deployment, so that time consumption of data in network transmission can be effectively reduced, requirements on network backhaul bandwidth and network load can be reduced, and a real-time and reliable positioning demand can be satisfied in practical applications. By determining the target image matching the environment image from a plurality of candidate images, calculating the position and pose information of the to-be-positioned device according to the position and pose information of the device for capturing the target image, and obtaining the positioning information therefrom, such that the positioning information can be effectively obtained by running a visual positioning algorithm in the MEC node by using a computer vision-based positioning method, regardless of whether the user turns on the GPS positioning system or not, and when the to-be-positioned device is located in scenarios that GPS is not available, such as on/under the viaduct, the main and auxiliary roads, the indoor and tall-building dense commercial areas, high-precision positioning can still be performed.

In the above-described embodiment and the following embodiment, a plurality of candidate images is taken within the coverage area of the MEC node. Since the environmental image received by the MEC node is captured by a device within the coverage area, the target image matched thereto should also be captured within the coverage area of the MEC node. When determining the target image, only a small number of candidate images needs to be matched with the environment image, thereby effectively accelerating the calculation of the visual positioning.

Figure 2A:
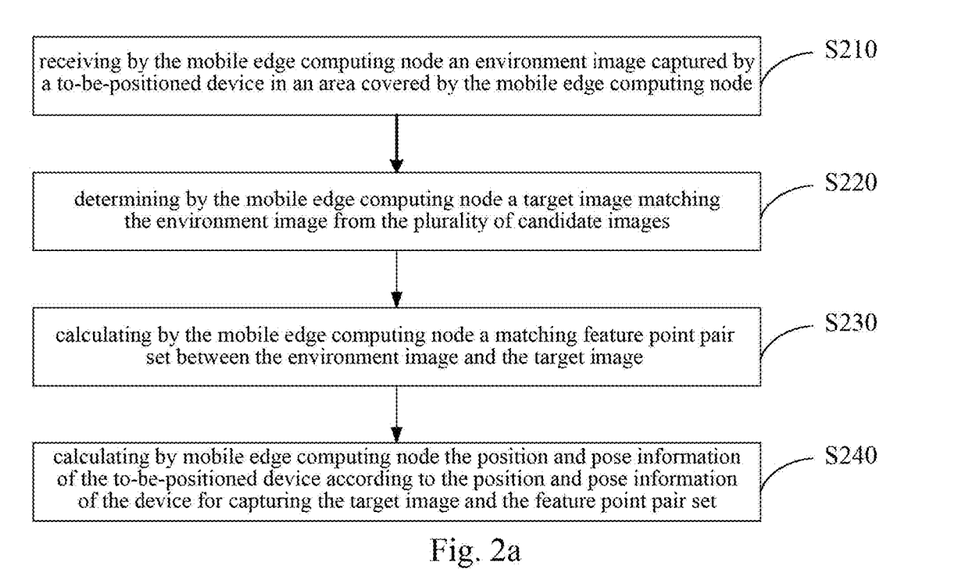
FIG. 2a is a flow chart of a second method for visual positioning based on mobile edge computing in an embodiment of the present disclosure.

According to an embodiment of the present disclosure, FIG. 2a is a flowchart of a second method for visual positioning based on mobile edge computing in embodiments of the present disclosure. Embodiments of the present disclosure optimize a calculation process of position and pose information on the basis of the technical solutions of the above-mentioned embodiments.

A second method for visual positioning based on mobile edge computing, as shown in FIG. 2a, includes S210 to S240.

S210 includes receiving by the mobile edge computing node an environment image captured by a to-be-positioned device in an area covered by the mobile edge computing node.

S220 includes determining by the mobile edge computing node a target image matching the environment image from the plurality of candidate images.

Figure 2B:
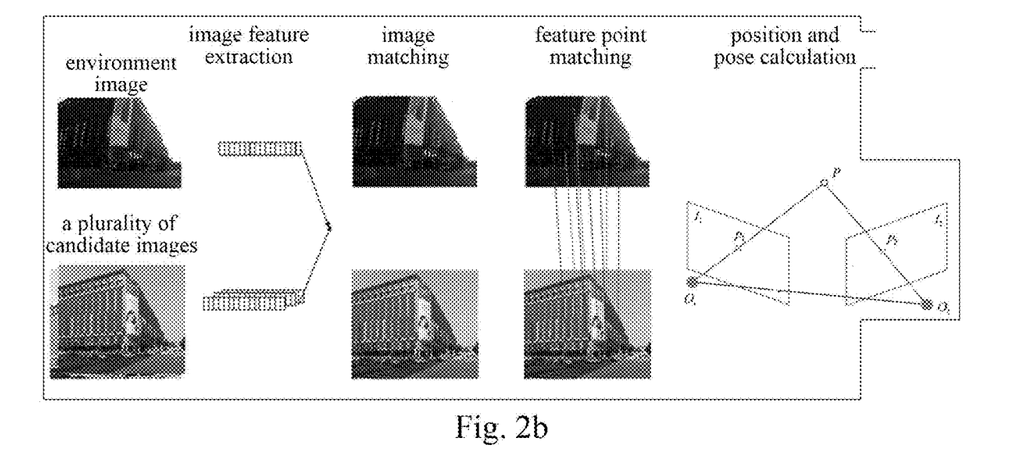
FIG. 2b is a schematic diagram of a calculation flow of position and pose information according to an embodiment of the present disclosure.

FIG. 2b is a schematic diagram of a calculation flow of position and pose information according to an embodiment of the present disclosure. As shown in FIG. 2b, the MEC node performs feature extraction on the target image to obtain image features of the target image. Specifically, a feature extraction model, based on SIFT (Scale-invariant feature transform) or based on a deep neural network, such as NetVLAD, is selected. NetVLAD is a convolutional neural network model with VLAD (Vector of locally aggregated descriptors) layers.

In this embodiment, as shown in FIG. 2b, a server (such as a cloud server) performs feature extraction on each candidate image in advance to obtain image features of each candidate image, and sends the image features of the candidate image to a MEC node of a corresponding coverage area according to the coverage area of the MEC node, and stores the image features of the candidate image in the image feature library of the MEC node.

The MEC node then searches for the target image matching the image features of the environment image from the plurality of candidate images using an approximate nearest neighbor search algorithm. In this embodiment, the target image matching the environment image is determined by image feature matching, and the feature matching is performed by an approximate nearest neighbor search algorithm. The approximate nearest neighbor search algorithm may be a graph-based, tree-based, or hash-based algorithm for an image feature of a given environmental image, the k most similar image features are found from image features of a plurality of candidate images, such as the aforementioned image feature library, where k is a natural number, such as 1.

According to the present embodiment, image matching is performed from an image feature dimension, a matched target image can be accurately found, and matching efficiency can be effectively improved by an approximate nearest neighbor search algorithm.

S230 includes calculating by the mobile edge computing node a matching feature point pair set between the environment image and the target image.

The entity types in the environment image and the target image are the same, and the entity orientations may be slightly different, that is, some feature points in the image features are not matched. In order to improve the positioning accuracy, the position and pose information of the device for capturing the environment image need to be adjusted according to the point pair set to obtain the position and pose information of the to-be-positioned device.

Optionally, a best-bin-first algorithm or a Random Sample Consensus (RANSAC) algorithm is used to find a plurality of matching feature point pairs from the image features of the environment image and the image features of the target image to form a feature point pair set. In FIG. 2b, pixels of the original image mapped from the feature point pairs are connected, and the matching relationship of the feature point pairs is visually represented.

S240 includes calculating by mobile edge computing node the position and pose information of the to-be-positioned device according to the position and pose information of the device for capturing the target image and the feature point pair set.

As shown in FIG. 2b, $I_1$ and $I_2$ are the matched target image and the environment image respectively. $P_1$ and $P_1$ are the coordinates of the point P in the actual space in the coordinate system of the device for capturing the target image and the coordinate system of the to-be-positioned device, respectively. $p_1$ and $p_2$ are pixels of $P_1$ and $P_1$ in the corresponding images, and $O_1$ and $O_2$ are the optical centers of the cameras for capturing the target image and the environment image, respectively, with the equation (1):

$$P_1=(X_1Y_1Z_1), P_2=(X_2Y_2Z_2); \qquad (1)$$

here, the rotation matrix from the target image to the environment image is set to R, the translation vector is set to t, and there is equation (2):

$$P_2=RP_1+t; \qquad (2).$$

Since the position and pose information of the device for capturing the target image is stored in the MEC node in advance, for obtaining the position and pose information of the to-be-positioned device, the motion from the device for capturing the target image to the to-be-positioned device needs to be estimated, that is, the purpose of estimation is to solve R and t.

According to the formula (2) and the principle of pinhole imaging, equation (3) is obtained:

$$K_1^{-1}p_2 = RK_2^{-1}p_1 + t; \quad (3)$$

where, $K_1$ and $K_2$ are internal parameters of the camera for capturing the target image and the environment image, respectively. R and t can be solved based on equation (3). Then, on the basis of the position and pose information of the device for capturing the target image, the position and pose information of the to-be-positioned device is obtained by rotating and translating according to R and t.

A group of position and pose information of a to-be-positioned device can be obtained based on each pair of feature points, and a plurality of groups of position and pose information can be obtained after calculation of the set of feature point pairs is completed. The final position and pose information is estimated by the least square method for multiple sets of position and pose information.

In the present embodiment, the position and pose information of the to-be-positioned device is calculated according to the position and pose information of the device for capturing the target image and the feature point pair set by using the pose estimation algorithm and the pinhole imaging principle, and the position and pose information of the device for capturing the environmental image is adjusted to obtain the position and pose information of the to-be-positioned device, thereby improving the positioning accuracy.

Figure 3:
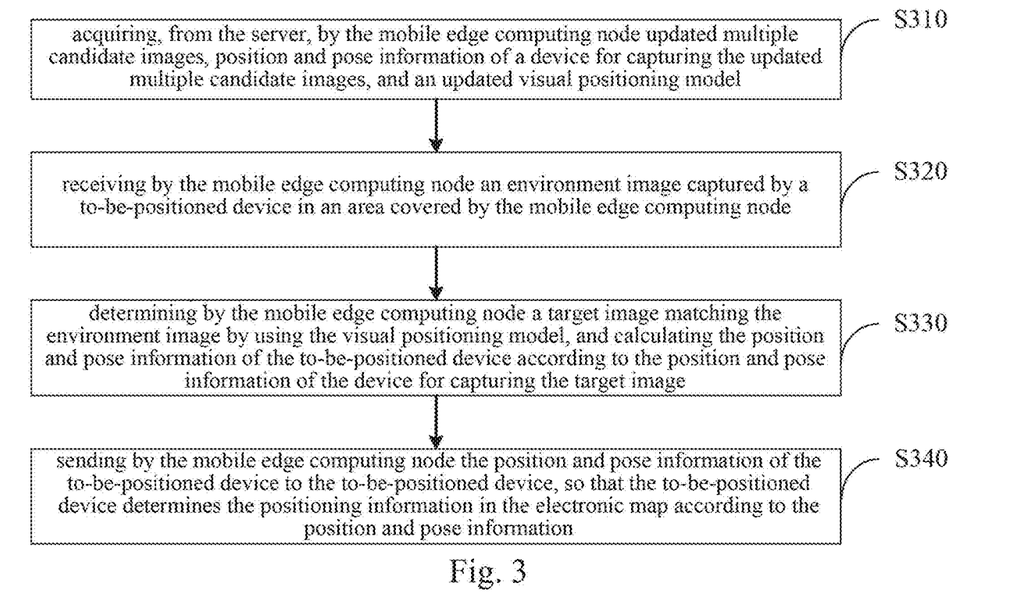
FIG. 3 is a flowchart of a third method for visual positioning based on mobile edge computing according to an embodiment of the present disclosure.

According to an embodiment of the present disclosure, FIG. 3 is a flowchart of a third method for visual positioning based on mobile edge computing in embodiments of the present disclosure. Embodiments of the present disclosure is optimized on the basis of the technical solutions of the above-mentioned embodiments.

Optionally, the operation "the mobile edge computing node determines the target image matching the environment image from the plurality of candidate images, and calculates the position and pose information of the to-be-positioned device according to the position and pose information of the device for capturing the target image" is specified to "the mobile edge computing node determines the target image matching the environment image through the visual positioning model, and calculates the position and pose information of the to-be-positioned device according to the position and pose information of the device for capturing the target image."

Optionally, before the operation "the mobile edge computing node receives the environmental image captured by the to-be-positioned device within the coverage area of the mobile edge computing node", an update mechanism of the MEC node is provided by adding "the mobile edge computing node acquires, from a server, updated multiple candidate images, position and pose information of the device for capturing the updated multiple candidate images, and an updated visual positioning model."

A third method for visual positioning based on mobile edge computing, as shown in FIG. 3, includes S310 to S340.

S310 includes acquiring, from the server, by the mobile edge computing node updated multiple candidate images, position and pose information of a device for capturing the updated multiple candidate images, and an updated visual positioning model.

In order to be able to continuously iterate the visual positioning effect of the MEC node, the candidate images, the position and pose information, and the visual positioning model of the MEC node need to be synchronously updated according to the update situation in the server. Optionally, if the MEC node also stores the image features of the candidate image, the image features of the candidate image need to be synchronously updated.

Optionally, the MEC node periodically requests updated multiple candidate images, position and pose information, and a visual positioning model within coverage of the MEC node from the server. Alternatively, when the server updates, the updated multiple candidate images, the position and pose information, and the visual positioning model are updated to the MEC node based on the coverage area of the MEC node.

S320 includes receiving by the mobile edge computing node an environment image captured by a to-be-positioned device in an area covered by the mobile edge computing node.

S330 includes determining by the mobile edge computing node a target image matching the environment image by using the visual positioning model, and calculating the position and pose information of the to-be-positioned device according to the position and pose information of the device for capturing the target image.

In the present embodiment, a calculation algorithm of the position and pose information is encapsulated in a visual positioning model. Optionally, the visual positioning model includes an image feature extraction unit, a similar candidate image calculation unit, an image feature point matching unit, and a position and pose calculation unit. The image feature extraction unit is configured to perform feature extraction on the target image to obtain image features of the target image. The similar candidate image calculation unit is configured to search for a target image matching an image feature of an environment image from a plurality of candidate images using an approximate nearest neighbor search algorithm. The image feature point matching unit is configured to calculate a feature point pair set matching the environment image and the target image. The position and pose calculation unit is configured to calculate the position and pose information of the to-be-positioned device based on the position and pose information and the feature point pair set of the device for capturing the target image.

S340 includes sending by the mobile edge computing node the position and pose information of the to-be-positioned device to the to-be-positioned device, so that the to-be-positioned device determines the positioning information in the electronic map according to the position and pose information.

The present embodiment can continuously iterate the visual positioning effect of the MEC node by updating the candidate images, the position and pose information, and the visual positioning model in the MEC node. By encapsulating the calculation algorithm of the position and pose information in the visual positioning model, the entire algorithm can be conveniently updated and maintained.

Figure 4A:
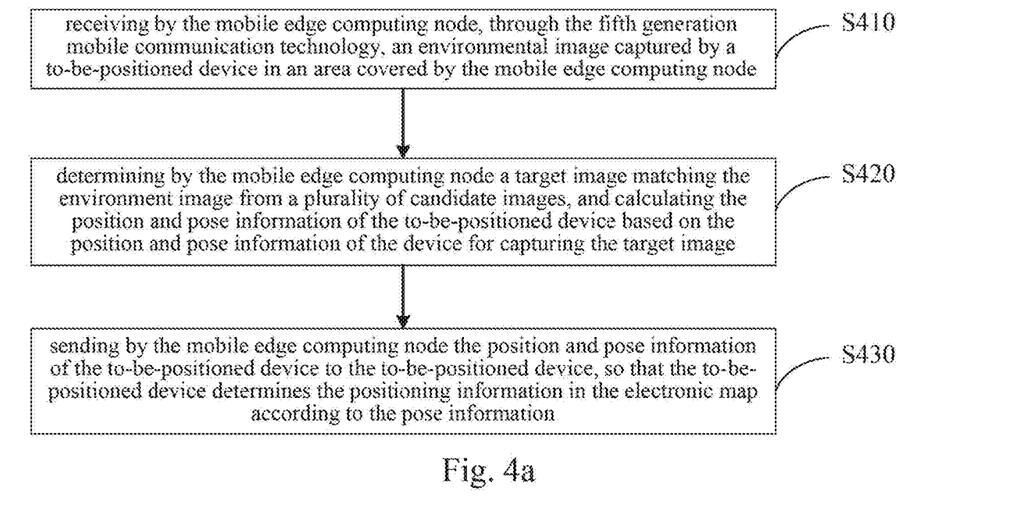
FIG. 4a is a flowchart of a fourth method for visual positioning based on mobile edge computing according to an embodiment of the present disclosure.

In embodiments of the present disclosure, FIG. 4a is a flowchart of a fourth method for visual positioning based on mobile edge computing in embodiments of the present disclosure. Embodiments of the present disclosure optimize a receiving process of an environmental image on the basis of the technical solutions of the above-mentioned embodiments.

A fourth method for visual positioning based on mobile edge computing, as shown in FIG. 4a, includes S410 to S430.

S410 includes receiving by the mobile edge computing node, through the fifth generation mobile communication technology, an environmental image captured by a to-be-positioned device in an area covered by the mobile edge computing node.

Figure 4B:
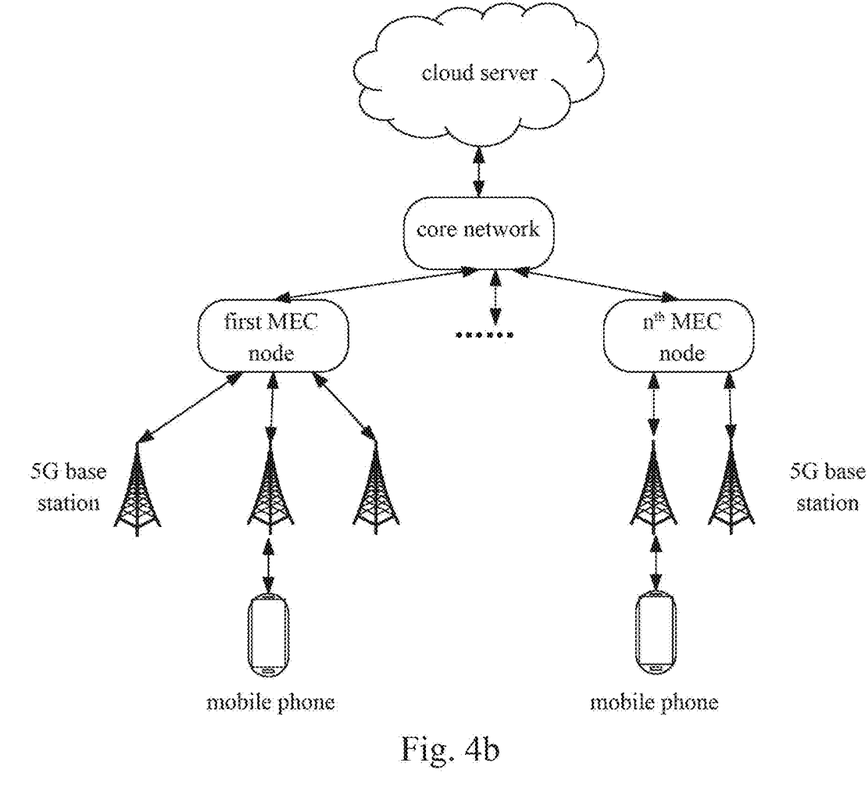
FIG. 4B is a flowchart of a system for visual positioning based on mobile edge computing according to an embodiment of the present disclosure.

FIG. 4B is a flow chart of a visual positioning system based on mobile edge computation according to an embodiment of the present disclosure. FIG. 4B includes a cloud server, a core network, n MEC nodes, a plurality of 5G base stations connected to each MEC node, and two handsets used as devices to be positioned.

Each MEC node downloads or updates, from a cloud server in advance, multiple candidate images captured by a device in a corresponding coverage area, position and pose information and a visual positioning model of the device for capturing the candidate images. Further, image features of the candidate image may also be downloaded or updated from the cloud server.

When a problem occurs by GPS positioning in a user navigation process, an environment image can be obtained by turning on a mobile phone camera to shoot a nearby conspicuous building, and upload the environment image through a 5G (5th generation mobile networks) network. After receiving the environment image, the 5G base station uploads the environment image to the MEC node covering the area in which the handset is located by selecting a near MEC node. S420 and S430 are then performed by the MEC node.

S420 includes determining by the mobile edge computing node a target image matching the environment image from a plurality of candidate images, and calculating the position and pose information of the to-be-positioned device based on the position and pose information of the device for capturing the target image.

S430 includes sending by the mobile edge computing node the position and pose information of the to-be-positioned device to the to-be-positioned device, so that the to-be-positioned device determines the positioning information in the electronic map according to the pose information.

In this embodiment, the visual positioning algorithm and the candidate image are deployed to the MEC node in advance based on the MEC deployment mode. After the to-be-positioned device captures the environment image, the near MEC node is selected through the 5G network access selection, and the 5G network has the advantages of low delay and high concurrency, so that the calculation of the visual positioning can be accelerated and the visual positioning with low delay can be provided.

Figure 5:
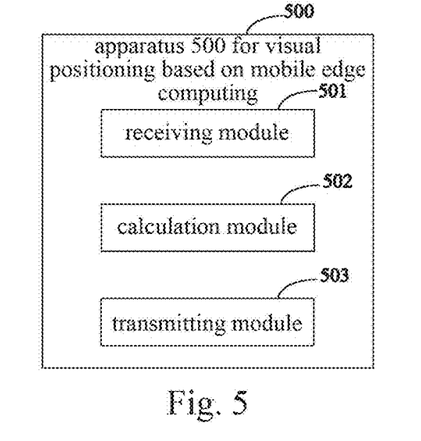
FIG. 5 is a block diagram of an apparatus for visual positioning based on mobile edge computing according to an embodiment of the present disclosure.

According to an embodiment of the present disclosure, FIG. 5 is a structural diagram of an apparatus for visual positioning based on mobile edge computing in embodiments of the present disclosure. Embodiments of the present disclosure are applicable to a case in which a device is positioned, and the apparatus is implemented in software and/or hardware and is specifically configured in an MEC node having a certain data operation capability.

Apparatus 500 for visual positioning based on mobile edge computing, as shown in FIG. 5, includes a receiving module 501, a calculation module 502, and a transmitting module 503.

The receiving module 501 is configured to receive an environment image captured by a to-be-positioned device in an area covered by the mobile edge computing node.

The calculation module 502 is configured to determine, from a plurality of candidate images, a target image matching an environment image, and calculating position and pose information of a to-be-positioned device according to the position and pose information of the device for capturing the target image.

The transmitting module 503 is configured to transmit the position and pose information of the to-be-positioned device to the to-be-positioned device, so that the to-be-positioned device determines the positioning information in the electronic map according to the pose information.

In this embodiment, the MEC node is used as an execution body, and the position and pose information of multiple candidate images and a device for capturing the candidate images are pre-deployed in the MEC node to form localization and close-distance deployment, so that time consumption of data in network transmission can be effectively reduced, requirements on network backhaul bandwidth and network load can be reduced, and a real-time and reliable positioning demand can be satisfied in practical applications. By determining the target image matching the environment image from multiple candidate images, calculating the position and pose information of the to-be-positioned device according to the position and pose information of the device for capturing the target image, and obtaining the positioning information therefrom, the positioning information can be effectively obtained by running a visual positioning algorithm in the MEC node by using a computer vision-based positioning method, regardless of whether the user turns on the GPS positioning system or not, and when the to-be-positioned device is in scenarios where GPS is unavailable such as on/under the viaduct, the main and auxiliary roads, the indoor and tall-building dense commercial areas.

Further, the multiple candidate images are captured within the coverage area of the mobile edge computing node.

Further, the calculation module 502 includes a determination unit, a feature point pair set calculation unit, and a position and pose information calculation unit. The determining unit is configured to determine a target image matching the environment image from the multiple candidate images; The feature point pair set calculation unit is configured to calculate a feature point pair set matching the environment image and the target image. The position and pose information calculation unit configured to calculate the position and pose information of the to-be-positioned device based on the position and pose information of the device for capturing the target image and the feature point pair set.

Further, the determination unit is specifically configured to perform feature extraction on the target image to obtain image features of the target image; and searching for a target image matching an image feature of an environment image from the multiple candidate images using an approximate nearest neighbor searching algorithm.

Further, the calculation module 502 is configured to determine a target image matching the environment image through the visual positioning model, and calculate the position and pose information of the to-be-positioned device according to the position and pose information of the device for capturing the target image.

Further, the apparatus further includes an updating module, configured to acquire updated multiple candidate images from the server, position and pose information of the device for capturing the updated multiple candidate images, and an updated visual positioning model before receiving the environment image captured by the to-be-positioned device in the coverage area of the mobile edge computing node.

Further, the receiving module 501 is specifically configured to receive the environment image captured by the to-be-positioned device in the coverage area of the mobile edge computing node through the fifth generation mobile communication technology.

The above-mentioned apparatus for visual positioning based on the mobile edge computing can execute the method for visual positioning based on the mobile edge computing provided in any one of embodiments of the present disclosure, and has corresponding functional modules and beneficial effects for executing the method for visual positioning based on the mobile edge computing.

According to an embodiment of the present disclosure, the present disclosure further provides an MEC node and a readable storage medium.

Figure 6:
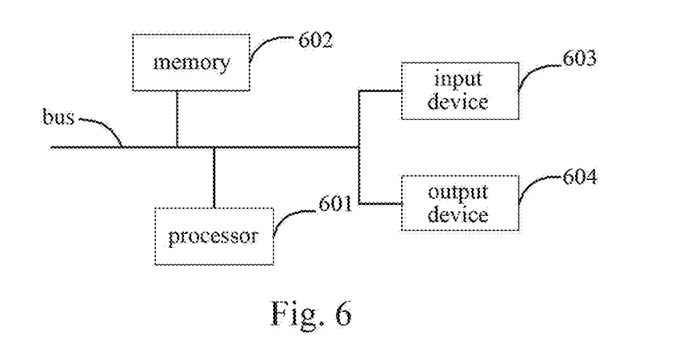
FIG. 6 is a block diagram of a mobile edge computing node adapted to implement the method for visual positioning based on mobile edge computing according to embodiments of the present disclosure.

As shown in FIG. 6, FIG. 6 is a block diagram of an MEC node for implementing the method for visual positioning based on the mobile edge computing according to embodiments of the present disclosure. The MEC node is intended to represent various forms of digital computers, such as laptop computers, desktop computers, worktables, personal digital assistants, servers, blade servers, mainframe computers, and other suitable computers. The MEC node may also represent various forms of mobile devices, such as personal digital processing, cellular telephones, smart phones, wearable devices, and other similar computing devices. The components shown herein, their connections and relationships, and their functions are by way of example only and are not intended to limit the implementation of the present disclosure as described and/or claimed herein.

As shown in FIG. 6, the MEC node includes one or more processors 601, a memory 602, and an interface for connecting components, including a high speed interface and a low speed interface. The various components are interconnected by different buses and may be mounted on a common motherboard or otherwise as desired. The processor may process instructions executed within the MEC node, including instructions stored in or on a memory to display graphical information of the GUI on an external input/output device, such as a display device coupled to an interface. In other embodiments, multiple processors and/or multiple buses may be used with multiple memories, if desired. Similarly, multiple MEC nodes may be connected, with each MEC node providing some of the necessary operations (e.g., as a server array, a set of blade servers, or a multiprocessor system). In FIG. 6, processor 601 is used as an example.

The memory 602 is a non-transitory computer readable storage medium provided by the present disclosure. The memory stores instructions executable by the at least one processor to cause the at least one processor to perform the method for visual positioning based on the moving edge computing provided according to the disclosure. The non-transitory computer-readable storage medium of the present disclosure stores computer instructions for causing a computer to perform the method of visual positioning based on mobile edge computing provided according to the disclosure.

The memory 602, as a non-transitory computer-readable storage medium, may be used to store non-transitory software programs, non-transitory computer-executable programs, and modules, such as program instructions/modules corresponding to a method for visual positioning based on mobile edge computing in an embodiment of the present disclosure (e.g., including a receiving module 501, a computing module 502, and a sending module 503 as shown in FIG. 5). The processor 601 executes various functional applications and data processing of the server by running non-transitory software programs, instructions, and modules stored in the memory 602, i.e., implementing the method for visual positioning based on mobile edge computing in the method embodiment described above.

The memory 602 may include a storage program area and a storage data area, where the storage program area may store an operating system, an application program required for at least one function. The storage data area may store data or the like created by use of an electronic MEC node that implements a method for visual positioning based on mobile edge computing. In addition, memory 602 may include high speed random access memory, and may also include non-transitory memory, such as at least one magnetic disk storage device, flash memory device, or other non-transitory solid state storage device. In some embodiments, memory 602 may optionally include remotely disposed memory relative to processor 601, which may be connected via a network to an MEC node performing a method for visual positioning based on mobile edge computing. Examples of such networks include, but are not limited to, the Internet, enterprise intranets, local area networks, mobile communication networks, and combinations thereof.

The MEC node performing the method for visual positioning based on the mobile edge computing may further include an input device 603 and an output device 604. The processor 601, the memory 602, the input device 603, and the output device 604 may be connected via a bus or otherwise, as illustrated in FIG. 6.

The input device 603 may receive input number or character information, and generate key signal input related to user settings and functional control of the MEC node performing the method for visual positioning based on the mobile edge computing, such as a touch screen, a keypad, a mouse, a track pad, a touch pad, a pointer bar, one or more mouse buttons, a track ball, a joystick, or the like. The output device 604 may include a display device, an auxiliary lighting device (e.g., an LED), a tactile feedback device (e.g., a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input device, and at least one output device, and transmit the data and instructions to the storage system, the at least one input device, and the at least one output device.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer includes: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of devices may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and techniques described herein may be implemented in a computing system including a backend component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such backend component, middleware component, or front-end component. The components of the system may be interconnected by any form or medium of digital data communication (e.g., a communication network). Examples of communication networks include local area networks (LANs), wide area networks (WANs), the Internet, and block chain networks.

The computer system may include a client and a server. The client and server are typically remote from each other and typically interact through a communication network. The relationship between the client and the server is generated by a computer program running on the corresponding computer and having a client-server relationship with each other.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for visual positioning based on mobile edge computing (MEC), comprising:
    receiving, by a MEC node, an environmental image captured by a to-be-positioned device in an area covered by the MEC node;
    determining, by the MEC node and by using an approximate nearest neighbor search algorithm, a target image matching the environment image from a plurality of candidate images pre-stored in the MEC node, wherein the MEC node pre-stores the plurality of candidate images and a plurality of pieces of position and pose information of a device capturing the plurality of candidate images;
    finding, by using a best-bin-first algorithm, a plurality of pairs of matching feature points from image features of the environment image and image features of the target image, to form a feature point pair set;
    calculating position and pose information of the to-be-positioned device based on the feature point pair set and position and pose information of a device at a time that the target image was captured by the device; and
    sending, by the MEC node, the position and pose information of the to-be-positioned device to the to-be-positioned device, so that the to-be-positioned device determines positioning information in an electronic map according to the position and pose information.

2. The method according to claim 1, wherein the plurality of candidate images are captured within a coverage area of MEC node.

3. The method according to claim 1, wherein the method further comprises: mapping a pair of matching feature points back to original images, and connecting pixels in the original images mapped from the pair of matching feature points, to visually represent matching relationships of the pair of matching feature points.

4. The method according to claim 1, wherein the determining by the MEC node the target image matching the environment image from the plurality of candidate images, comprises:
    performing feature extraction by the MEC node on the target image to obtain image features of the target image; and
    searching, using the approximate nearest neighbor search algorithm by the MEC node, for a target image matching an image feature of the environment image from the plurality of candidate images.

5. The method according to claim 1, wherein the determining, by the MEC node and by using an approximate nearest neighbor search algorithm, a target image matching the environment image from a plurality of candidate images pre-stored in the MEC node, comprises:
    determining by the MEC node the target image matching the environment image through a visual positioning model.

6. The method according to claim 5, wherein before the receiving, by the MEC node, the environmental image captured by the to-be-positioned device in the area covered by the MEC node, the method further comprises:
    acquiring, from a server by the MEC node, an updated plurality of candidate images, position and pose information of the device at a time that the updated plurality of candidate images were captured by the device, and the updated visual positioning model.

7. The method according to claim 1, wherein the receiving, by the MEC node, the environmental image captured by the to-be-positioned device in the area covered by the MEC node comprises:
    receiving, by the MEC node, the environmental image captured by the to-be-positioned device in the area covered by the MEC node through fifth generation mobile communication technology.

8. The method according to claim 1, wherein the calculating position and pose information of the to-be-positioned device based on position and pose information of the device that captured the target image and the feature point pair set, comprises:
    calculating, by using a pose estimation algorithm and pinhole imaging principle, the position and pose information of the to-be-positioned device based on the position and pose information of the device that captured the target image and the feature point pair set; and adjusting the position and pose information of the device that captured the environmental image to obtain the position and pose information of the to-be-positioned device.

9. The method according to claim 8, wherein the calculating position and pose information of the to-be-positioned device based on position and pose information of the device that captured the target image and the feature point pair set, comprises:

obtaining a group of position and pose information of the to-be-positioned device based on each pair of feature points, and obtaining a plurality of groups of position and pose information after calculation on the feature point pair set is completed; and applying a least square method on the plurality of groups of position and pose information, to estimate the final position and pose information of the to-be-positioned device.

10. A mobile edge computing (MEC) node comprising:
at least one processor; and
a memory in communication with the at least one processor; wherein, the memory stores instructions executable by the at least one processor, the instructions being executed by the at least one processor to enable the at least one processor to perform operations, the operations comprising:

receiving, an environmental image captured by a to-be-positioned device in an area covered by the MEC node;

determining by using an approximate nearest neighbor search algorithm, a target image matching the environment image from a plurality of candidate images pre-stored in the MEC node, wherein the MEC node pre-stores the plurality of candidate images and a plurality of pieces of position and pose information of a device capturing the plurality of candidate images;

finding, by using a best-bin-first algorithm, a plurality of pairs of matching feature points from image features of the environment image and image features of the target image, to form a feature point pair set;

calculating position and pose information of the to-be-positioned device based on the feature point pair set and position and pose information of a device at a time that the target image was captured by the device; and sending the position and pose information of the to-be-positioned device to the to-be-positioned device, so that the to-be-positioned device determines positioning information in an electronic map according to the position and pose information.

11. The MEC node according to claim 10, wherein the plurality of candidate images are captured within a coverage area of the MEC node.

12. The MEC node according to claim 10, wherein the operations further comprise: mapping a pair of matching feature points back to original images, and connecting pixels in the original images mapped from the pair of matching feature points, to visually represent matching relationships of the pair of matching feature points.

13. The MEC node according to claim 10, wherein the determining the target image matching the environment image from the plurality of candidate images, comprises:

performing feature extraction by the MEC node on the target image to obtain image features of the target image; and searching, by using the approximate nearest neighbor search algorithm, for a target image matching an image feature of the environment image from the plurality of candidate images.

14. The MEC node according to claim 10, wherein the determining, by using an approximate nearest neighbor search algorithm, the target image matching the environment image from the plurality of candidate images pre-stored in the MEC node, comprises:

determining the target image matching the environment image through a visual positioning model.

15. The MEC node according to claim 14, wherein before the receiving, the environmental image captured by the to-be-positioned device in the area covered by the MEC node, the operations further comprise:

acquiring, from a server, an updated plurality of candidate images, position and pose information of the device at a time that the updated plurality of candidate images were captured by the device, and the updated visual positioning model.

16. The MEC node according to claim 10, wherein the receiving, the environmental image captured by the to-be-positioned device in the area covered by the mobile edge computing MEC node comprises:

receiving the environmental image captured by the to-be-positioned device in the area covered by the MEC node through fifth generation mobile communication technology.

17. A non-transitory computer-readable storage medium storing computer instructions for causing a computer to perform operations, the operations comprising:

receiving, by a MEC node, an environmental image captured by a to-be-positioned device in an area covered by the MEC node;

determining, by the MEC node and by using an approximate nearest neighbor search algorithm, a target image matching the environment image from a plurality of candidate images pre-stored in the MEC node, wherein the MEC node pre-stores the plurality of candidate images and a plurality of pieces of position and pose information of a device capturing the plurality of candidate images;

finding, by using a best-bin-first algorithm, a plurality of pairs of matching feature points from image features of the environment image and image features of the target image, to form a feature point pair set;

calculating position and pose information of the to-be-positioned device based on the feature point pair set and position and pose information of a device at a time that the target image was captured by the device; and sending, by the MEC node, the position and pose information of the to-be-positioned device to the to-be-positioned device, so that the to-be-positioned device determines positioning information in an electronic map according to the position and pose information.

18. The storage medium according to claim 17, wherein the plurality of candidate images are captured within a coverage area of the MEC node.

19. The storage medium according to claim 17, wherein the operations further comprise: mapping a pair of matching feature points back to original images, and connecting pixels in the original images mapped from the pair of matching feature points, to visually represent matching relationships of the pair of matching feature points.

20. The storage medium according to claim 17, wherein the determining by the MEC node the target image matching the environment image from the plurality of candidate images, comprises:
    performing feature extraction by the MEC node on the target image to obtain image features of the target image; and
    searching, using the approximate nearest neighbor search algorithm by the MEC node, for a target image matching an image feature of the environment image from the plurality of candidate images.

\* \* \* \* \*